United States Patent [19]

Hurner

[11] Patent Number: 5,098,560

[45] Date of Patent: Mar. 24, 1992

[54] APPARATUS FOR HEATING AND DEMOISTURIZING DIESEL FUEL

[76] Inventor: Erwin E. Hurner, 920 Belsly Blvd., South, Moorhead, Minn. 56560

[21] Appl. No.: 662,983

[22] Filed: Feb. 28, 1991

Related U.S. Application Data

[63] Continuation of Ser. No. 566,563, Aug. 13, 1990, abandoned, which is a continuation of Ser. No. 309,105, Feb. 13, 1990, Pat. No. 4,995,992.

[51] Int. Cl.⁵ .......................................... B01D 17/032
[52] U.S. Cl. .................................... 210/136; 210/533
[58] Field of Search ............................... 210/311–313, 210/532.1, 533, 136

[56] References Cited

U.S. PATENT DOCUMENTS

| | | | |
|---|---|---|---|
| 1,422,559 | 7/1922 | Germani | 210/533 |
| 2,338,971 | 1/1944 | Ross | 210/532.1 |
| 2,548,568 | 4/1951 | Swank | 210/532.1 |
| 2,656,926 | 10/1953 | Garaycochea | 210/533 |
| 3,929,187 | 12/1975 | Hurner | 165/52 |
| 4,257,890 | 3/1981 | Hurner | 210/112 |
| 4,372,847 | 2/1983 | Lewis | 210/86 |
| 4,437,986 | 3/1984 | Hutchins | 210/130 |
| 4,624,779 | 11/1986 | Hurner | 210/180 |

*Primary Examiner*—W. Gary Jones
*Assistant Examiner*—Matthew O. Savage
*Attorney, Agent, or Firm*—Bailey & Hardaway

[57] ABSTRACT

A fuel treatment apparatus having a settling chamber with a fuel introducing conduit passing through the top of the chamber and extending to a lower portion of the chamber to define a fuel inlet in the lower portion of the chamber. A buoyant valve means is located within the first conduit means to permit fuel introduction during normal operation but to close off the conduit during periods of non-operation and thus closing off fluid communication between the fuel treatment apparatus and the fuel tank. A fuel outlet is provided to remove the fuel after the treatment. A recess in the bottom of the chamber has drain means in the bottom thereof for the removal of moisture from the bottom of the chamber. Novel means are provided to permit introduction of fuel when the normal fuel inlet is clogged, for example, by the freezing of collected moisture therein. This is provided by means of a secondary small fuel inlet in an upper portion of the first conduit means.

1 Claim, 2 Drawing Sheets

APPARATUS FOR HEATING AND DEMOISTURIZING DIESEL FUEL

This application is a continuation of Ser. No. 07/566,563, filed Aug. 13, 1990, now abandoned, which was a continuation of Ser. No. 07/309,105, filed Feb. 13, 1990, now U.S. Pat. No. 4,995,992.

BACKGROUND OF THE INVENTION

This invention relates generally to the art of fuel treatment and, more particularly, to an apparatus for removing contaminants from diesel fuel.

Various prior art devices have been developed with the treatment of fuel for use in internal combustion engines. Diesel fuel in particular has required some substantial treatment in order to prevent contaminants or adverse weather conditions from effecting the combustion process.

U.S. Pat. No. 3,929,187 issued Dec. 30, 1975, discloses a heat exchange apparatus in order to prevent diesel fuel from jelling during periods of operation in extremely cold climates. U.S. Pat. No. 4,257,890 describes an apparatus for removing water from diesel fuel during normal operation of the vehicle. Other fuel treatment devices are described in U.S. Pat. Nos. 4,437,986 and 4,372,847.

A significant advance in the treatment of diesel fuel is described in U.S. Pat. No. 4,624,779 issued Nov. 25, 1986.

While each of these apparatuses perform well for their intended function, a need has always existed for further improvement in devices for treating fuel for internal combustion engines.

SUMMARY OF THE INVENTION

It is thus and object of this invention to provide a novel apparatus for removing contaminants from diesel fuel.

It is a further object of this invention to provide such apparatus which simultaneously heats such fuel while removing contaminants.

It is a still further object of this invention to provide such an apparatus which has a collection zone for accumulating separated water and other contaminants.

It is a still further and yet more particular object of this invention to provide a novel method for draining and novel drain for removal of contaminants from a closed system.

It is a still further and yet more particular object of this invention to provide such an apparatus which will render the diesel operation operable when collected water has frozen and otherwise impaired operation of a fuel inlet.

These as well as other objects are accomplished by a fuel treatment apparatus having a settling chamber with a fuel introducing conduit passing through the top of the chamber and extending to a lower portion of the chamber to define a fuel inlet in the lower portion of the chamber. A buoyant valve means is located within the first conduit means to permit fuel introduction during normal operation but to close off the conduit during periods of non-operation and thus closing off fluid communication between the fuel treatment apparatus and the fuel tank. A fuel outlet is provided to remove the fuel after the treatment. A recess in the bottom of the chamber has drain means in the bottom thereof for the removal of moisture from the bottom of the chamber. Novel means are provided to permit introduction of fuel when the normal fuel inlet is clogged, for example, by the freezing of collected moisture therein. This is provided by means of a secondary small fuel inlet in an upper portion of the first conduit means.

DETAILED DESCRIPTION OF THE DRAWINGS

According to this invention, it has been found that a fuel treatment apparatus may be provided which permits introduction of fuel during normal engine operation, but which precludes communication with the fuel tank during periods of non-operation. This permits drainage of moisture and other contaminants during period of shut-off without causing siphoning of the fuel treatment chamber back to the fuel tank. A novel drain structure has been found to significantly enhance the ability to remove accumulated water from the fuel treatment chamber. A secondary fuel inlet is provided to permit operation of the engine when accumulated water has frozen and closed the primary fuel inlet. Various other advantages and features will become apparent from a reading of the following description given with reference to the various figures and drawings.

Figure 1:
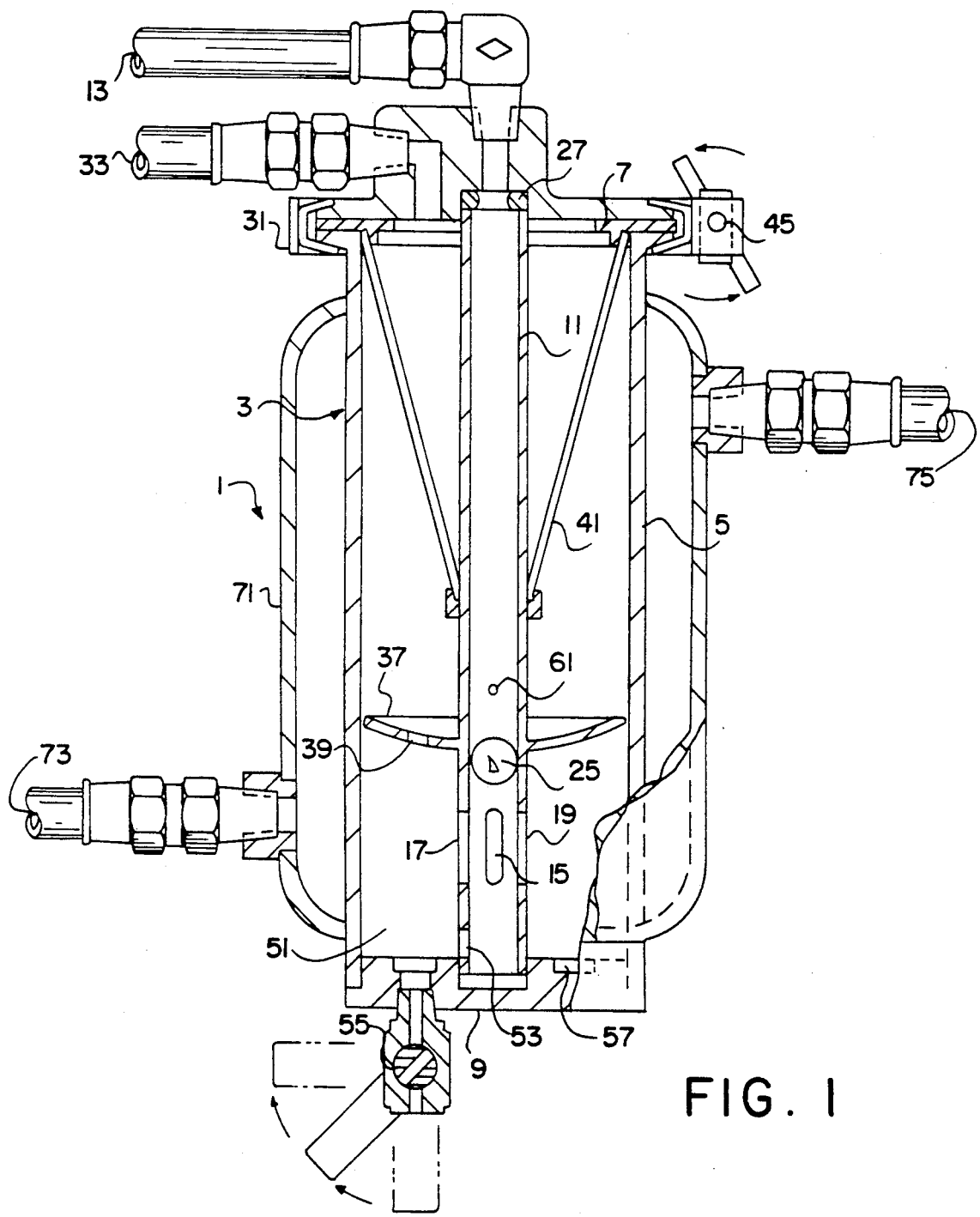
FIG. 1 of the drawings is a cutaway view of a fuel treatment apparatus in accordance with this invention.

FIG. 1 of the drawings illustrates the apparatus 1 in accordance with this invention. FIG. 1 is a cutaway view of an otherwise generally cylindrical-shaped apparatus such that any cross-section would show basically the same features except that this particular cutaway illustrates inlets and outlets all in the same plain for purposes of illustration. The apparatus 1 comprises means 3 defining a settling chamber having a side wall 5 a top 7 and bottom 9.

A first conduit means 11 is in communication with the source of fuel as to tank through means 13. First conduit means 11 defines a fuel inlet in the bottom of the chamber through slots 15 fully illustrated and 17 and 19 only partially illustrated in the cutaway view.

Figure 2:
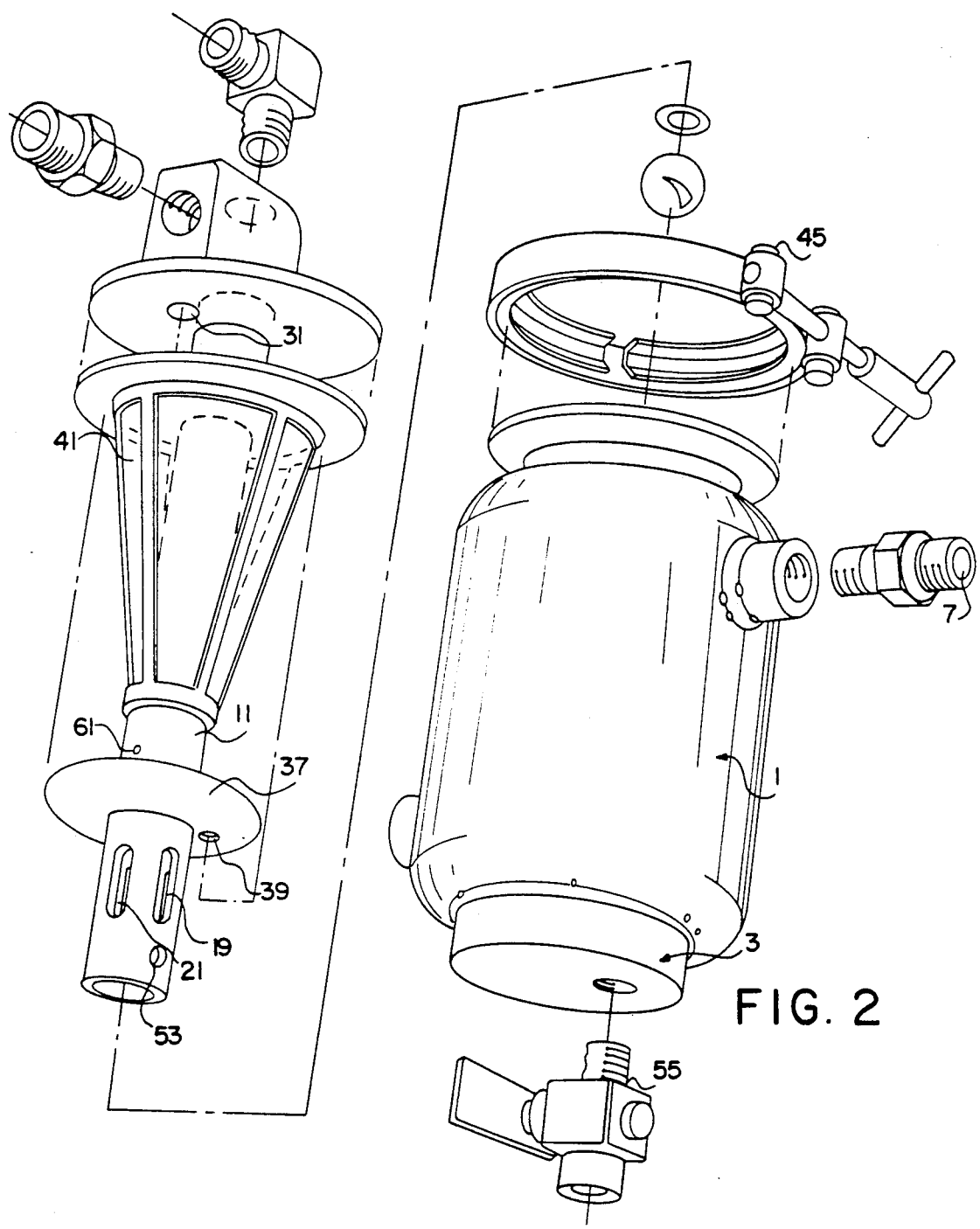
FIG. 2 of the drawings is an assembly view of the apparatus in accordance with this invention.

The assembly view of FIG. 2 better illustrates the fuel inlets 19 and 21. It is thus seen that fuel travels through 13 down first conduit means 11 and out the fuel inlets 15, 17, 19 and 21 located in a lower portion of chamber 3. First conduit means 11 has located therein a buoyant valve means 25 which during non-operation and a full fuel condition floats up first conduit means 11 to a restriction 27 in the form of a O-ring sealing the first conduit means within the chamber. Thus, in operation the buoyant valve means 27 is forced down to permit the fuel to flow through the first conduit means and out the primary fuel inlets, but upon non-operation of the fuel engine the buoyant valve means 25 floats upperwardly thorough the conduit means and prevents fuel communication back through means 13 to the fuel tank.

The flotation time between the bottom or lower portion of the chamber as illustrated in FIG. 1 of the drawings to contact restriction 27 has a lag time preferably of about 4 seconds. During this lag time, any debris within the fuel passes down conduit means such that upon contact of buoyant valve means 25 with restriction 27 no debris remains to adversely effect the seal between 25 and 27.

Buoyant valve means 25 is illustrated here in the form of a metallic hollow shell ball of much in the form of a ping-pong ball so as to be buoyant within diesel fuel.

Thus, during normal operation, the fuel enters through first conduit means 11 passes through the fuel inlets 15, 17, 19 and 21 while contacting buoyant valve means 25 and forcing same into a lower position and out second conduit means 31 defined through the top of said chamber and acting as an outlet to permit fuel to pass on through means 33 for use in a combustion engine. Provided within chamber 3 for treatment of the fuel is a spreader 37 defining a drain orifice 39 therein and a water oil separator 41. These components are well described in U.S. Pat. No. 4,624,779, the disclosure which is hereby incorporated by a reference. These components are clamped within the chamber 3 by clamping means 45 to thereby form a closed system.

During normal operation, moisture and other debris accumulate at the bottom of the chamber as at 51. Conduit means 11 has a means 53 therein to permit communication by moisture and debris to the bottom portion 51 of the chamber 3.

Located in the bottom of chamber 3 is drain means 55. It has surprisingly been found that the location of a drain means within a recess 57 greatly enhances the ability to drain water from the system. Recess 57 is in the form of an annulus about the bottom 9 of chamber 3. In actual operation water droplets appear almost magnetically attracted to recess 57 for drainage through drain means 55.

Of course, during the draining process buoyant valve means 25 is located against restriction 27 so that upon opening the system siphoning back through means 13 to the fuel tank does not occur. Upon opening of valve means 55, moisture drains from the system and is replaced by air which is quickly displaced upon engine operation.

A significant advance is provided by first conduit means 11 defining a secondary fuel inlet 61 above the primary fuel inlets 15 through 21 which permits fuel to enter the system if accumulated water freezes closing off primary outlets 15 through 21. The secondary outlet 61 is referred to as a weep hole and permits only a sufficient amount of fuel to enter the system so as to maintain idle speed.

A water jacket 71 is provided which utilizes water from the cooling system of the internal combustion engine and permits the cooling fluid to enter at 73 and exit at 75 to heat chamber 3 and, more specifically, to heat any fuel flowing through the small gap between spreader 37 and wall 5. This heating process effects the frosting of any frozen fuel which may clog the primary fuel inlets by idle operation through secondary fuel inlets 61 located in an upper portion of the chamber above the primary fuel inlets.

It is thus seen that the apparatus of this invention and the process which it conducts provides a novel apparatus for moving contaminants from diesel fuel. It is further seen that the apparatus may simultaneously heat the fuel and remove contaminants.

The apparatus provides a novel drainage means as well as a valving system to permit such drainage. The apparatus also provides for recovery operation upon a freezing of any contaminants so as to block primary fuel and inlet.

As many variations will become apparent to those of skill in the art from a reading of the above description which is exemplary in nature, such variations are embodied within the spirit and scope of the following appended claims.

That which is claimed is:

1. To a fuel treatment apparatus comprising a chamber defined by a side wall, a top and a bottom, and including drain means in the bottom thereof, wherein water is separated from said fuel during a flow of said fuel through said chamber, the improvement comprising:

inlet means in a bottom portion of said chamber for directing a flow of fuel into said chamber, said inlet means including buoyant valve means for permitting fuel to flow into said bottom portion while preventing fuel from flowing out of said bottom portion;

exit means in a top portion of said chamber for directing a flow of fuel out of said chamber;

an annular recess in said bottom of said chamber with said drain means in the bottom of the recess at the bottom of said chamber whereby drainage of water from said annular recess occurs in a direction opposite to the flow of fuel in said chamber.

* * * * *